US007722467B2

(12) United States Patent
Tabata

(10) Patent No.: US 7,722,467 B2
(45) Date of Patent: May 25, 2010

(54) VIDEO GAME CONTROL SYSTEM AND A VIDEO GAME CONTROL SERVER

(75) Inventor: Hajime Tabata, Tokyo (JP)

(73) Assignee: Kabushi Kaisha Square Enix, Tokyo (JP)

( * ) Notice: Subject to any disclaimer, the term of this patent is extended or adjusted under 35 U.S.C. 154(b) by 46 days.

(21) Appl. No.: 11/855,561

(22) Filed: Sep. 14, 2007

(65) Prior Publication Data

US 2008/0076569 A1   Mar. 27, 2008

(30) Foreign Application Priority Data

Sep. 21, 2006   (JP)   .............................. 2006-256530

(51) Int. Cl.
*A63F 13/12* (2006.01)
(52) U.S. Cl. ........................... 463/42; 463/41; 273/460; 273/461; 709/203; 709/218; 715/706; 715/757; 715/764
(58) Field of Classification Search ................. 463/1–5, 463/7–13, 16, 20, 25, 29–34, 36–42, 49–57; 345/4; 348/739; 315/291–292; 434/130, 434/305; 84/609, 619; 273/145 R, 147, 273/141 A, 148 R, 148 B, 309, 317.1, 340, 273/348, 361–367, 454–456, 460–461; 709/203–207, 709/217–219, 225, FOR. 106, FOR. 115, 709/FOR. 122, FOR. 130, FOR. 131, FOR. 132, 709/FOR. 141, FOR. 148, FOR. 149, FOR. 153; 715/706, 738, 744, 757, 758, 762–764; 704/E15.047; A63F 13/12
See application file for complete search history.

(56) References Cited

U.S. PATENT DOCUMENTS 5,931,734 A * 8/1999 Nakatani et al. .............. 463/23

6,259,431 B1 * 7/2001 Futatsugi et al. ............ 345/157

(Continued)

FOREIGN PATENT DOCUMENTS

GB   2417694   3/2006

(Continued)

OTHER PUBLICATIONS

English language Abstract of JP 2003-190634.

(Continued)

*Primary Examiner*—Peter DungBa Vo
*Assistant Examiner*—Arthur O. Hall
(74) *Attorney, Agent, or Firm*—Greenblum & Bernstein, P.L.C.

(57) ABSTRACT

When usage command information is received from any one of player terminals, an integrated attack determiner determines whether or not an attack action by an attack command is to be an integrated attack action, in which the attack actions by the attack commands included in a usage history are integrated, on the basis of a current position of the user terminal. The integrated attack determiner also determines attack power specification information capable of specifying the attack power in the case where it is determined that the attack action is to be the integrated attack action. An attack instruction information transmitter transmits attack instruction information indicating a determination result of the integrated attack determiner to the player terminal. A usage history information updater updates the usage history information by adding the received usage command information to the usage history of the attack commands.

18 Claims, 5 Drawing Sheets

U.S. PATENT DOCUMENTS

| | | | |
|---|---|---|---|
| 6,319,121 B1 * | 11/2001 | Yamada et al. | 463/8 |
| 6,554,707 B1 * | 4/2003 | Sinclair et al. | 463/39 |
| 6,582,230 B1 * | 6/2003 | Aoshima et al. | 434/118 |
| 6,606,104 B1 * | 8/2003 | Kondo et al. | 715/764 |
| 6,691,032 B1 | 2/2004 | Irish et al. | |
| 6,729,954 B2 * | 5/2004 | Atsumi et al. | 463/7 |
| 6,733,392 B2 | 5/2004 | Narita | |
| 6,736,724 B1 * | 5/2004 | Erikawa et al. | 463/7 |
| 6,761,638 B1 | 7/2004 | Narita | |
| 7,059,963 B2 * | 6/2006 | Okamura et al. | 463/3 |
| 7,585,224 B2 * | 9/2009 | Dyke-Wells | 463/31 |
| 7,587,764 B2 * | 9/2009 | Cox | 726/23 |
| 2002/0007396 A1 * | 1/2002 | Takakura et al. | 709/205 |
| 2002/0060427 A1 * | 5/2002 | Hinami | 273/237 |
| 2002/0142834 A1 * | 10/2002 | Sobue | 463/30 |
| 2002/0184200 A1 * | 12/2002 | Ueda et al. | 707/3 |
| 2003/0036428 A1 | 2/2003 | Aasland | |
| 2003/0069029 A1 * | 4/2003 | Dowling et al. | 455/456 |
| 2003/0114224 A1 * | 6/2003 | Anttila et al. | 463/40 |
| 2003/0224855 A1 | 12/2003 | Cunningham | |
| 2004/0243308 A1 | 12/2004 | Irish et al. | |
| 2004/0259634 A1 * | 12/2004 | Machida | 463/29 |
| 2005/0107145 A1 * | 5/2005 | Karashima et al. | 463/8 |
| 2005/0119053 A1 * | 6/2005 | Suzuki et al. | 463/42 |
| 2005/0130728 A1 * | 6/2005 | Nguyen et al. | 463/16 |
| 2006/0003843 A1 * | 1/2006 | Kobayashi et al. | 463/43 |
| 2006/0046810 A1 | 3/2006 | Tabata | |
| 2006/0189382 A1 * | 8/2006 | Muir et al. | 463/29 |
| 2007/0060306 A1 * | 3/2007 | Amaitis et al. | 463/25 |
| 2009/0201199 A1 * | 8/2009 | Preston et al. | 342/357.07 |

FOREIGN PATENT DOCUMENTS

| | | |
|---|---|---|
| JP | 10165648 A * | 6/1998 |
| JP | 2001-096069 | 4/2001 |
| JP | 2001-187271 | 7/2001 |
| JP | 2003-062353 | 3/2003 |
| JP | 2003-190634 | 7/2003 |
| JP | 3767741 | 2/2006 |
| WO | 2005/026870 | 3/2005 |

OTHER PUBLICATIONS

English language Abstract of JP2001-096069.
English language Abstract of JP2003-190634.
English language Abstract of JP2001-187271.
U.S. Appl. No. 11/854,727 to Nomura et al., filed Sep. 13, 2007.
U.S. Appl. No. 11/856,153 to Tabata, filed Sep. 17, 2007.
U.S. Appl. No. 11/856,156 to Tabata, filed Sep. 17, 2007.
"Weekly FAMI-TSU (a double number for Jun. 9 and 16, 2006 (Before Crisis Final Fantasy. VII)" (Enterbrain, Inc., Jun. 9, 2006, vol. 21, No. 23, p. 90), and an English language partial translation.
"Weekly FAMI-TSU (Oct. 8, 2004 (Before Crisis Final Fantasy. VII)" (Oct. 8, 2004, vol. 19, No. 41, pp. 208-209), and an English language partial translation.
"Weekly FAMI-TSU (Jun. 8, 2004 (Before Crisis Final Fantasy. VII)" (Enterbrain, Inc., Jun. 18, 2004, vol. 19, No. 25, p. 147), and an English language partial translation.
"Dengeki PlayStation, vol. 7, No. 29, (Depth Fantasy)" (Media Works, Nov. 9, 2001, vol. 7, No. 29, p. 220), and an English language partial translation.
"Dengeki PlayStation, vol. 11, No. 36, (Monster Farm 5: Circus Caravan)" (Media Works, Oct. 28, 2005, vol. 11, No. 36, pp. 222-223), and an English language partial translation.
English language Abstract of JP 2003-062353.
U.S. Appl. No. 11/854,727 to Nomura et al., filed on Sep. 13, 2007.
U.S. Appl. No. 11/856,153 to Tabata, filed on Sep. 17, 2007.
U.S. Appl. No. 11/856,156 to Tabata, filed on Sep. 17, 2007.

* cited by examiner

FIG. 3

TABLE FOR HISTORY OF USAGE OF BATTLE COMMAND

| POSITIONAL DATA | TIME DATA | PLAYER ID | COMMAND NAME |
|---|---|---|---|
| (xx, yy) | 16:20 | AAAA | SPECIAL TECHNIQUE A |
| (xx, ya) | 17:45 | BBBB | SPECIAL TECHNIQUE B |
| (xx, yb) | 17:46 | CCCC | SPECIAL TECHNIQUE A |
| (xa, yy) | 18:00 | DDDD | SPECIAL TECHNIQUE A |
| (xb, ya) | 18:21 | EEEE | SPECIAL TECHNIQUE C |
| (xc, yy) | 18:22 | FFFF | MAGIC A |
| ... | ... | ... | ... |

FIG. 6

TABLE FOR FUSION DETERMINATION CONDITION

| COMMAND NAME | POSITION RANGE SUBJECTED TO DETERMINATION | PERIOD SUBJECTED TO DETERMINATION |
|---|---|---|
| SPECIAL TECHNIQUE A | WITHIN 500 m | WITHIN 2 HOURS |
| SPECIAL TECHNIQUE B | WITHIN 700 m | WITHIN 3 HOURS |
| SPECIAL TECHNIQUE C | WITHIN 1000 m | WITHIN 5 HOURS |
| MAGIC A | WITHIN 500 m | WITHIN 2 HOURS |
| MAGIC B | WITHIN 800 m | WITHIN 4 HOURS |
| DARING TECHNIQUE | WITHIN 2000 m | WITHIN 24 HOURS |
| ...... | ...... | ...... |

FIG. 7

TABLE FOR DETERMINATION OF OFFENSIVE POWER

| COMMAND NAME \ SEARCH NUMBER | ONE | TWO | ...... |
|---|---|---|---|
| SPECIAL TECHNIQUE A | 1 TIME (NORMAL) | 2 TIMES | ...... |
| SPECIAL TECHNIQUE B | 1 TIME (NORMAL) | 2 TIMES | ...... |
| SPECIAL TECHNIQUE C | 2 TIMES | 4 TIMES | ...... |
| MAGIC A | 1.5 TIMES | 3 TIMES | ...... |
| MAGIC B | 1.8 TIMES | 5 TIMES | ...... |
| DARING TECHNIQUE | 1 TIME (NORMAL) | 2 TIMES | ...... |
| ...... | ...... | ...... | ...... |

VIDEO GAME CONTROL SYSTEM AND A VIDEO GAME CONTROL SERVER

CROSS-REFERENCE TO RELATED APPLICATION

The present disclosure relates to subject matter contained in Japanese Patent Application No. 2006-256530, filed on Sep. 21, 2006, the disclosure of which is expressly incorporated herein by reference in its entirety.

BACKGROUND OF THE INVENTION

1. Field of the Invention

The present invention relates to a technique for controlling at least part of progress of a video game played on each of a plurality of player terminals, which a plurality of players respectively operate, via a communication network.

2. Description of the Related Art

Heretofore, various kinds of so-called network delivery type games are presented. Such a network delivery type game is supplied to a mobile communication terminal such as cellular phone terminal via a communication network such as the Internet. In such a network delivery type game, there are various games such as a role playing game as the video game (RPG; that is, a game in which a player plays a role of a character in a world of the game, and accomplishes a predetermined object while enjoying a process that the character grows through various experiences), for example.

Further, heretofore, there is a game in which positional information is used for control of progress of the game when the game is provided to a mobile communication terminal (for example, see Japanese Patent Application Publication No. 2001-96069 and Japanese Patent No. 3,767,741).

Japanese Patent Application Publication No. 2001-96069 discloses an identification number of a neighboring base station, which is to obtained when a mobile communication terminal such as a cellular phone terminal and a personal handyphone system (PHS) makes a communication with a server, is used not only for communication but also progress of a game when the game is played in the mobile communication terminal. More specifically, depending on which base station a player is located within the range of, an obtainable item, an entering character and/or a scenario to be selected are differentiated in the game. Thus, it is possible to differentiate game contents depending on a location to play the game even in the same game. This makes it possible to diversify the game contents.

Further, Japanese Patent No. 3,767,741 discloses that positional information of a player obtained by means of measurement using a global positioning system (GPS) is used as data for a game.

In the conventional technique as described above, the contents of the game is associated with a player's own position, by which the game contents are allowed to be diversified. However, in this technique, multiple kinds of characters, items and patterns of scenarios are prepared in advance, and a specific character, an item and a pattern of a scenario are merely selected in accordance with the positional information. Therefore, there has been a problem that diversification of the game contents has a limitation.

SUMMARY OF THE INVENTION

It is one object of the present invention to solve the problems described above and to provide a video game control system and a video game control server capable of unpredictably changing the contents of a video game using positional information indicating a position of a player, and of further diversifying the game contents in a video game in which the positional information is used, and this makes it possible to improve player's interest in play of the video game.

In order to achieve the above object, one aspect of the present invention is directed to a video game control system. The video game control system includes: a plurality of player terminals respectively operated by a plurality of players, a video game being played in each of the plurality of player terminals; and a video game control server for controlling at least part of progress of the video game via a communication network. In this case, each of the player terminals includes an attack command receiver that receives specification of an attack command for specifying an attack action that a player character is caused to execute by means of an attack specification operation by the player.

Each of the player terminals also includes a position measurer that measures a current position of the player terminal when the attack command receiver receives the specification of the attack command.

Each of the player terminals also includes a usage command information transmitter that transmits usage command information to the video game control server via the communication network, the usage command information including attack command information indicating an attack command received by the attack command receiver, current position information indicating a current position of the player terminal measured by the position measurer and player identification information for uniquely identifying the player.

Each of the player terminals also includes an attack command executor that causes the player character to execute the attack action specified on the basis of the attack command received by the attack command receiver.

Further, in this case, the video game control server includes a usage history information memory for storing usage history information indicating a usage history of attack commands for each of the plurality of player terminals.

The video game control server also includes an integrated attack determiner that, when usage command information is received from any one of the player terminals, determines whether or not an attack action by an attack command indicated by attack command information is to be an integrated attack action on the basis of a current position of the user terminal indicated by current position information, the received usage command information including the attack command information and the current position information, the attack actions by the attack commands included in the usage history indicated by the usage history information being integrated in the integrated attack action, the integrated attack determiner also determining attack power information indicating attack power of the integrated attack action (for example, direct value such as attack power "100" or attack power "150") or attack power specification information capable of specifying the attack power (for example, indirect values such as attack power twice as normal attack power, or attack power three times as normal attack power) in the case where it is determined that the attack action is to be the integrated attack action.

The video game control server also includes an attack instruction information transmitter that transmits attack instruction information indicating a determination result of the integrated attack determiner to the player terminal.

The video game control server also includes a usage history information updater that updates the usage history information by adding the received usage command information to the usage history of the attack commands.

Moreover, in this case, the attack command executor causes the player character to execute the integrated attack action when receiving from the video game control server the attack instruction information including information that it is determined that the attack action is to be the integrated attack action, in the integrated attack action the attack power of the attack action indicated by the attack command received by means of the attack command receiver being set as the attack power indicated by the attack power information or the attack power specified by the attack power specification information, the received attack instruction information including the attack power information and the attack power specification information.

Since the video game control system may have the configuration described above, it is possible to unpredictably change the contents of a video game using positional information indicating a position of a player. It is also possible to further diversify the game contents in a video game in which the positional information is used. This makes it possible to improve player's interest in play of the video game.

It is preferable that the integrated attack determiner determines that the attack action is to be the integrated attack action in the case where more than the predetermined number of attack commands each of which is identical to the attack command indicated by the attack command information included in the usage command information received from the player terminal and that have been used within a predetermined distance range from the current position of the player terminal indicated by the current position information included in the received usage command information are included in the usage history indicated by the usage history information. In this case, it is preferable that the integrated attack determiner determines the attack power information or the attack power specification information so that the attack power of the integrated attack gradually increases in accordance with the number of the included attack commands, which is more than the predetermined number.

It is preferable that the integrated attack determiner determines that the attack action is to be the integrated attack action in the case where more than the predetermined number of attack commands each of which is identical to the attack command indicated by the attack command information included in the usage command information received from the player terminal and that have been used within a predetermined distance range from the current position of the player terminal indicated by the current position information included in the received usage command information and within a predetermined period of time are included in the usage history indicated by the usage history information. In this case, it is preferable that the integrated attack determiner determines the attack power specification information so that the attack power of the integrated attack action gradually increases in accordance with the number of the included attack commands that is more than the predetermined number.

It is preferable that the integrated action determiner refers to the usage histories registered in the usage history information other than the usage history of the attack command for the player terminal that has transferred the usage command information to the video game control server.

It is preferable that the video game control server further comprises a virtual usage history information memory for storing virtual usage history information indicating a usage history of an attack command virtually created. In this case, it is preferable that the integrated attack determiner determines whether or not the attack action is to be the integrated attack action using the virtual usage history information in place of the usage history information in the case where the current position of the player terminal indicated by the current position information included in the received usage command information is positioned within a specific area.

It is preferable that the integrated attack determiner determines whether or not the attack action is to be the integrated attack action further using the usage history in the virtual usage history information in the case where the number of the usage histories of the attack command in the usage history information is less than the predetermined number.

It is preferable that the integrated attack determiner determines the attack power information or the attack power specification information using a table for determination of attack power specification information in which the number of the corresponding attack commands is associated with the attack power information or the attack power specification information.

It is preferable that the position measurer measures the current position of the player terminal on the basis of positioning signals from a plurality of positioning satellites.

It is preferable that the usage history information includes used attack command information indicating an attack command that has been used, usage position information indicating the position of the player terminal when the attack command is used, usage time information indicating time when the attack command is used, and the player identification information. In this case, it is preferable that the usage history information updater creates additional information to the usage history information by specifying the attack command indicated by the attack command information included in the received usage command information as the used attack command information, specifying the position information indicated by the current position information included in the received usage command information as the usage position information, adding the player identification information included in the received usage command information and determining the usage time information on the basis of reception of the usage command information, and updates the usage history information.

Further, in another aspect of the present invention, the present invention is directed to a video game control server for controlling at least part of progress of a video game via a communication network. In this case, the video game is played in each of a plurality of player terminals, and the plurality of player terminals are respectively operated by a plurality of players. The video game control server of the present invention includes a usage history information memory for storing usage history information indicating a usage history of attack commands for each of the plurality of player terminals.

The video game control server also includes an integrated attack determiner that, when usage command information is received from any one of the player terminals via the communication network, determines whether or not an attack action by an attack command indicated by attack command information is to be an integrated attack action on the basis of a current position of the user terminal indicated by current position information, the usage command information including the attack command information indicating the attack command for specifying the attack action specified by an attack specification operation by the player, which a player character in the player terminal is caused to execute, the current position information indicating the current position of the player terminal measured by a position measurer of the player terminal for measuring a current position of the player terminal when the attack command is specified, and player identification information for uniquely identifying the player, the attack actions by the attack commands included in the usage history indicated by the usage history information being integrated in the integrated attack action, the integrated attack determiner also determining attack power information indicating attack power of the integrated attack action or attack power specification information capable of specifying the attack power in the case where it is determined that the attack action is to be the integrated attack action.

The video game control server also includes an attack instruction information transmitter that transmits attack instruction information indicating a determination result of the integrated attack determiner to the player terminal, so that the player character is caused to execute the integrated attack action in which the attack power of the attack action indicated by the attack command specified in the player terminal by means of the attack specification operation by the player is set as the attack power indicated by the attack power information or the attack power specified by the attack power specification information, the attack instruction information including the attack power information and the attack power specification information.

The video game control server also includes a usage history information updater that updates the usage history information by adding the received usage command information to the usage history of the attack commands.

According to the present invention, it is possible to unpredictably change the contents of a video game using positional information indicating a position of a player. It is also possible to further diversify the game contents in a video game in which the positional information is used. This makes it possible to improve player's interest in play of the video game.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

FIG. 3 is an explanatory drawing that shows an example of a table for a history of usage of battle commands.

FIG. 6 is an explanatory drawing that shows an example of a table for a fusion determination condition.

FIG. 7 is an explanatory drawing that shows an example of a table for determination of offensive power.

DETAILED DESCRIPTION OF THE INVENTION

Preferred embodiments of a video game control system and a video game control server according to the present invention will now be described in detail with reference to the appending drawings.

Figure 1:
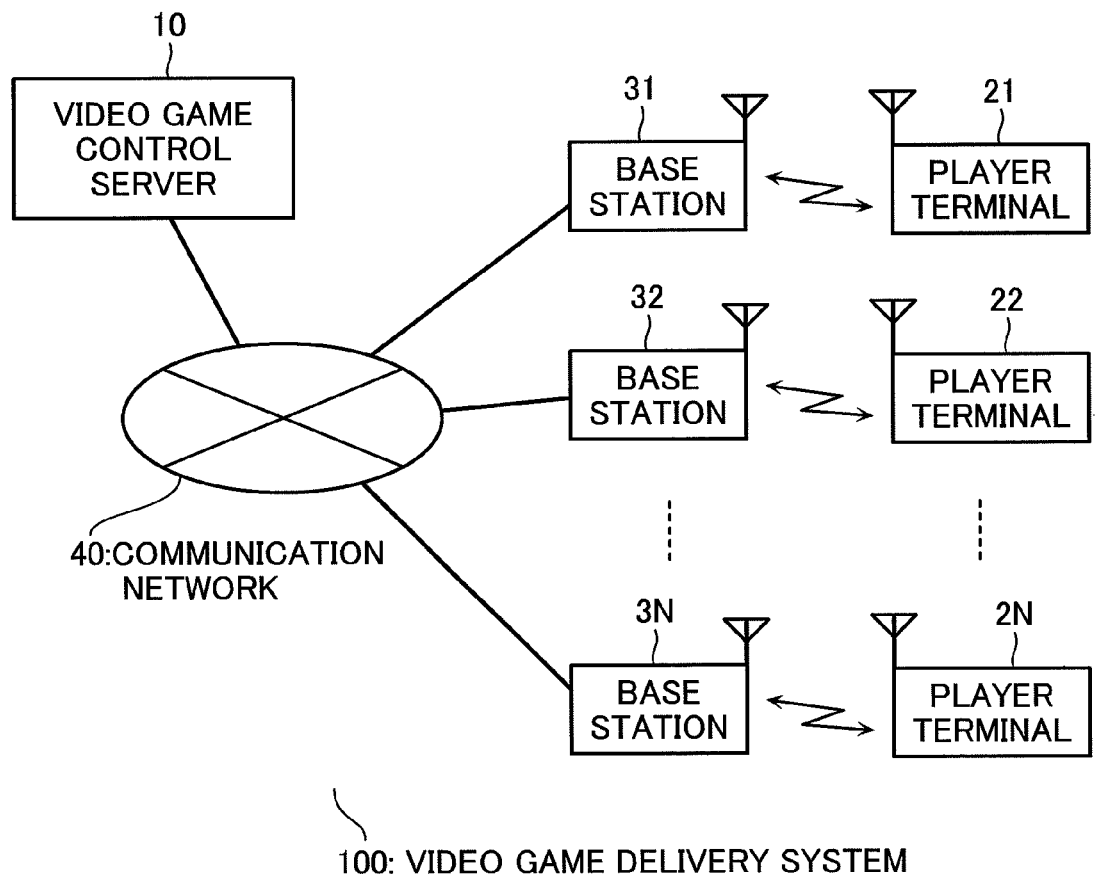
FIG. 1 is a block diagram that illustrates an example of a configuration of a video game delivery system.

FIG. 1 is a block diagram that illustrates an example of a configuration of a video game delivery system 100 according to one embodiment of the present invention. As shown in FIG. 1, the video game delivery system 100 includes the video game control server 10, a plurality of player terminals 21 to 2N ("N" is an arbitrary positive integer) and a plurality of base stations 31 to 3N.

Each of the video game control server 10 and the plurality of base stations 31 to 3N is connected to a communication network 40 such as the Internet. Further, the plurality of player terminals 21 to 2N are respectively connected to the plurality of base stations 31 to 3N with wireless communication. Thus, the plurality of player terminals 21 to 2N are respectively connected to the communication network 40 via the plurality of base stations 31 to 3N.

The video game control server 10 is managed by a system manager (or administrator) of the video game delivery system 100. The video game server 10 has various functions for providing (or delivering) a video game for each of the player terminals 21 to 2N via the communication network 40. The video game control server 10 is constituted from an information processing apparatus such as a WWW server.

The player terminals 21 to 2N are respectively managed by players of the video game. Each of the player terminals 21 to 2N is constituted from a mobile communication terminal in which a network delivery type video game can be played, such as a cellular phone terminal, a personal digital assistant (PDA) and a mobile game device, for example. Each of the player terminals 21 to 2N includes hardware and software for connecting itself to the communication network 40 via the base stations 31 to 3N. Each of the player terminals 21 to 2N includes a display device inside or outside the player terminal itself. The display device has an image display screen constituted from a television apparatus or a liquid crystal display. Further, each of the player terminals 21 to 2N includes a position measuring section 21a, an operation/control section 21b and a terminal information processing section 21c (see FIG. 4). The position measuring section 21a receives positioning signals (GPS signals) from a plurality of GPS satellites, and measures a current position of each of the player terminals 21 to 2N using the received GPS signals. The operation/control section 21b is constructed from operation section including operational buttons operated by the player, for example, and a control section for controlling the whole player terminal 21 or 2N. The terminal information processing section 21c deals with information relating to the player terminal 21 or 2N.

Each of the base stations 31 to 3N is managed by a communication carrier. The base stations 31 to 3N are devices for connecting the player terminals 21 to 2N to the communication network 40 by executing data communication with the player terminals 21 to 2N positioned within a communicable area with wireless communication.

Figure 2:
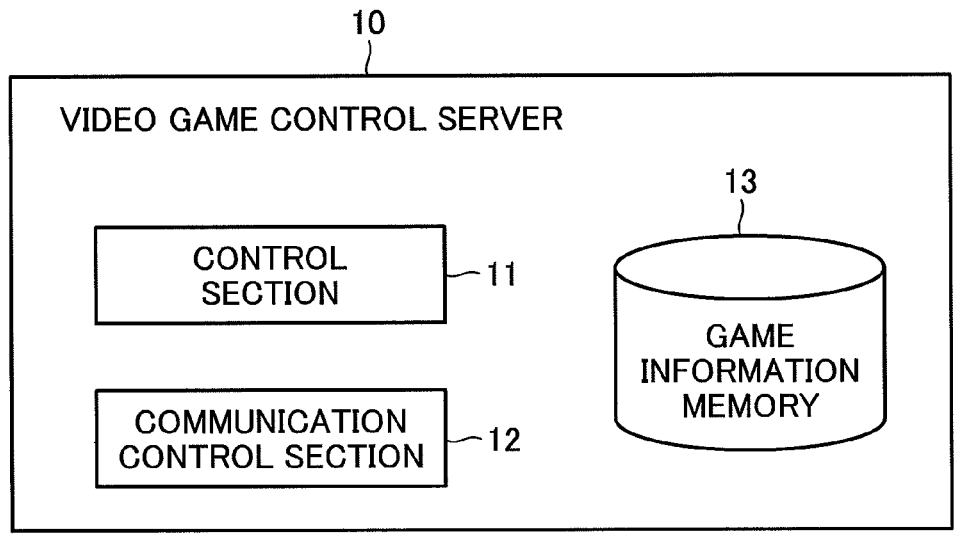
FIG. 2 is a block diagram that illustrates an example of a configuration of a video game control server.

FIG. 2 is a block diagram that illustrates an example of a configuration of the video game control server 10. As shown in FIG. 2, the video game control server 10 includes a control section 11, a communication control section 12, and a game information memory 13.

The control section 11 executes control processes of the whole video game control server 10 in accordance with control programs stored in the game information memory 13.

The communication control section 12 has a function to execute communication between the player terminals 21 to 2N, for example, via the communication network 40 such as the Internet.

The game information memory 13 is constructed from a database apparatus, for example. Various kinds of data such as a table for a history of usage of battle commands (will be described later) and control programs for the video game are stored in the game information memory 13, which is a storage media.

In this regard, the video game delivered in the present embodiment is an RPG including a portion in which the video game proceeds when a plurality of characters, including a player character (that is, a character that moves in accordance with operations of a keypad by a player), moves on a field provided in a virtual three-dimensional space, or executes a battle against an enemy character that thwarts an action of the player character for accomplishment of a predetermined object in the video game. Further, the virtual three-dimensional space in which the field is formed is indicated by coordinates of the world coordinate system.

FIG. 3 is an explanatory drawing that shows an example of a table for a history of usage of battle commands.

As shown in FIG. 3, battle command usage history information in which positional data, time data, a player ID, and a command name of a battle command are associated with each other is registered in the battle command usage history table. The positional data indicates a position of corresponding player character 21 or 2N when using a battle command (or attack command: That is a command for specifying an attack contents such as a simple attack, an attack with a tool, an attack with a special technique, an attack with magic. The battle command includes a command for using a special skill such as an attack item and a call for a beast). The time data indicates time when the battle command is used. The player ID is used to uniquely specify the corresponding player terminal 21 or 2N in which the battle command is used. Namely, the battle command usage history information indicating where, when, which battle command, which player uses is registered in the battle command usage history table. In this case, a phone number of a cellular phone terminal that the corresponding player uses as the player terminal or an e-mail address applied to the cellular phone terminal may be utilized as the player ID. Number information of the cellular phone terminal is memorized in a detachable memory medium such as an IC chip, and replacement of the memory chip allows the player to use his or her own personal information such as the number information in another terminal. In such a case, since identification information such as a serial number is applied to the memory medium, the identification information of the memory medium may be used as the player ID.

In this regard, the player ID is not necessarily included in management items of the battle command usage history table described above. However, in the case where the player ID is included in the management items, a predetermined process can be executed. Namely, for example, even when the same battle commands exist within a predetermined geographic and time range, a count can be canceled out in the case where the same player activates the battle commands. Thus, it is desirable that the player ID is included in the management items of the battle command usage history table. This makes it possible to prevent the same player, who wants to activate a fusion attack surely, from sequentially activating the same battle commands in a short time. Therefore, it is possible to properly keep the degree of difficulty for clear of the video game. Further, it is also possible to prevent other player from suffering a harmful influence due to the battle command usage history left by the player who intentionally activated the same battle commands in series.

Whenever a battle command is used in each of the player terminals 21 to 2N, the battle command usage history information relating to the used battle command is registered in the battle command usage history table so as to be added thereto.

The positional data is constituted from coordinates data for specifying a position of the player terminal by means of latitude and longitude, for example. The time data may be data for specifying the time when the battle command is used. The time data may be data representing time (hour and minute information) as illustrated in FIG. 3, data including day information, or data including second information. The player ID is a unique ID that is beforehand applied to each player. The command name is a name of a command that is beforehand set for every battle command, such as a special technique "A", magic "A" and a daring technique "A". In this regard, a command ID that is beforehand set for every battle command may be included in the battle command usage history information in place of the command name.

Next, an operation of the video game delivery system 100 according to the present embodiment will be described.

Figure 4:
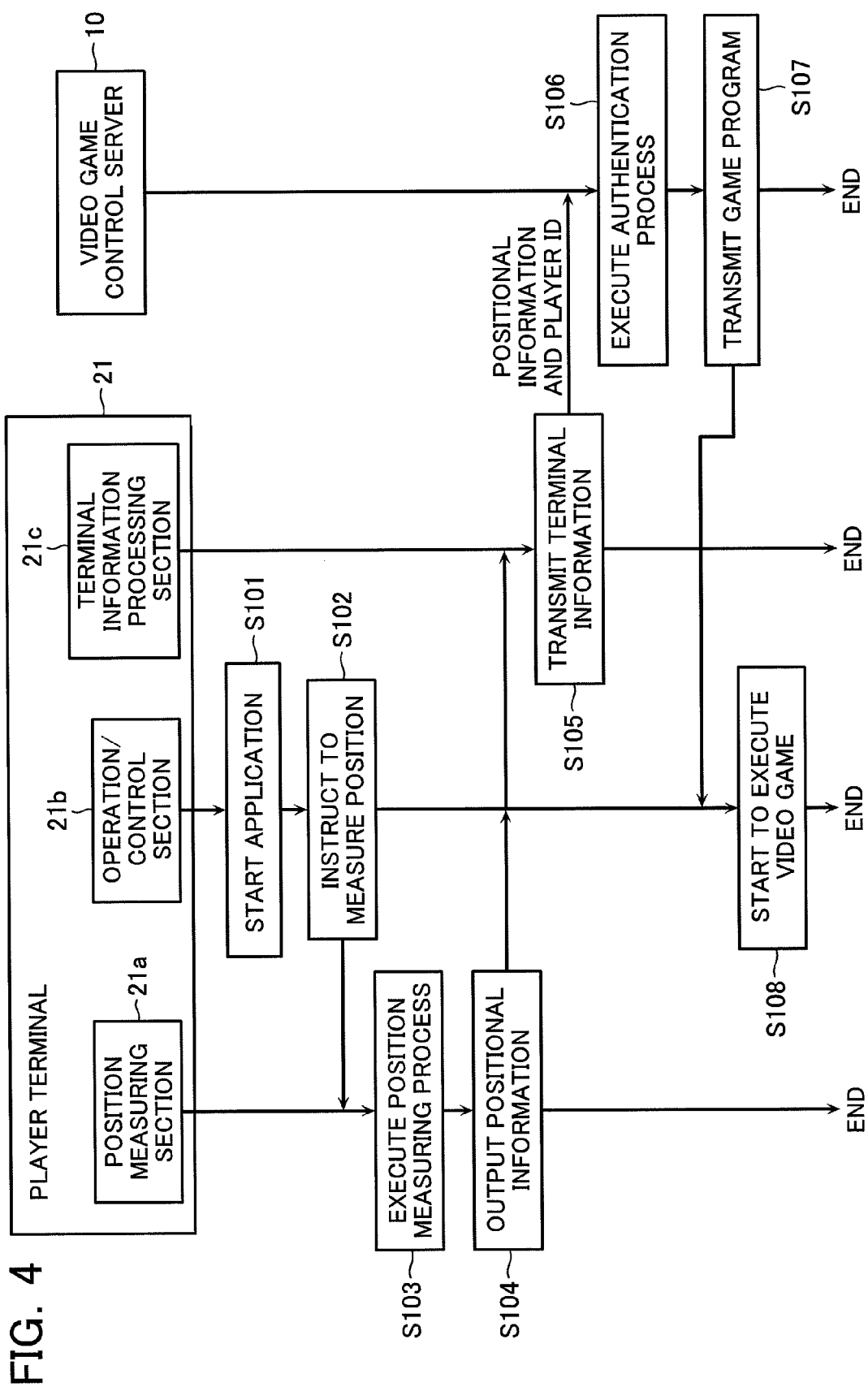
FIG. 4 is a flowchart that illustrates an example of a game start process.
Figure 5:
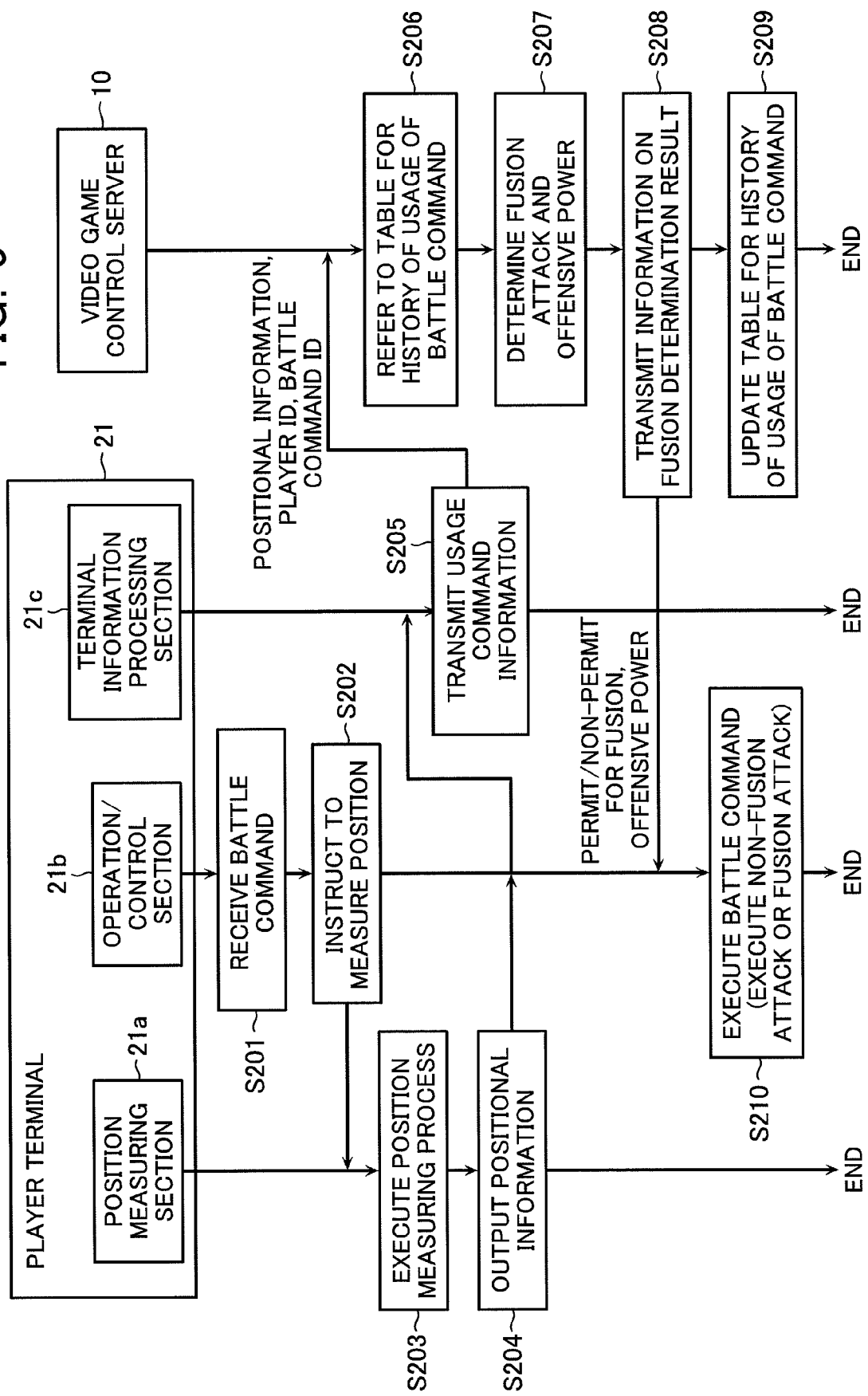
FIG. 5 is a flowchart that illustrates an example of a fusion attack control process.

FIG. 4 is a flowchart that illustrates an example of a game start process in the video game delivery system 100 of the present embodiment. FIG. 5 is a flowchart that illustrates an example of a fusion attack control process in the video game delivery system 100 of the present embodiment. Here, in order to simplify the explanation of the game start process and the fusion attack control process, a player P plays a video game G by operating a player terminal 21 of the player P. Further, in order to explain a process for delivering the video game G to the player terminal 21, explanation for any process other than the processes relating to the present invention, in particular, may be omitted.

In the game start process, the operation/control section 21b of the player terminal 21 activates (or starts) a game application for executing the video game G in accordance with an operation of the player P (Step S101). Once the game application is activated, the operation/control section 21b outputs an instruction for measurement of a position of the player terminal 21 to the position measuring section 21a (Step S102). The position measuring section 21a executes a position measuring process for measuring a current position of the player terminal 21 in response to the instruction for position measurement (Step S103), and then outputs positional information indicating the measurement result (Step S104).

When the positional information is received from the position measuring section 21a via the operation/control section 21b, the terminal information processing section 21c creates terminal information including the received positional information and a player ID applied to the player P, and then transmits the created terminal information to the video game control server 10 via the base station 31 and the communication network 40, for example (Step S105).

When the terminal information is received, the video game control server 10 executes an authentication process using the player ID included in the received terminal information (Step S106). In this case, the authentication process is not limited to one using the player ID, and may be another using other information such as a password or biologic information. In the case where the player P is authenticated, the video game control server 10 stores the current position of the player P (that is, the player terminal 21) by registering the positional information included in the received terminal information in a player position setting table (not shown in the drawings) so that the positional information is associated with the player ID. The video game control server 10 then transmits a game program (video game program) for delivering the video game G to the player terminal 21 (Step S107). In this regard, registration information in the player position setting table is to be updated whenever the player terminal 21 makes an access to the video game control server 10 for providing the positional information of the player terminal 21.

When the game program is received, the operation/control section 21b of the player terminal 21 starts the game application using the received game program, that is, starts to execute the video game G (Step S108). After the video game G is started, the fusion attack control process is executed whenever a battle command is used during execution of the video game G.

In the fusion attack control process, when the operation/control section 21b of the player terminal 21 receives specification of a battle command by means of an operation of the player P (Step S201), the operation/control section 21b outputs an instruction for measurement of a position of the player terminal 21 to the position measuring section 21a (Step S202). The position measuring section 21a executes a position measuring process for measuring a current position of the player terminal 21 in response to the instruction for position measurement (Step S203), and then outputs positional information indicating the measurement result (Step S204).

When the positional information is received from the position measuring section 21a via the operation/control section 21b, the terminal information processing section 21c creates usage command information including the received positional information, a battle command ID indicating the battle command received at Step S201 by the operation/control section 21b and a player ID applied to the player P, and then transmits the created usage command information to the video game control server 10 via the base station 31 and the communication network 40, for example (Step S205). In this case, the terminal information processing section 21c obtains the corresponding battle command ID from the operation/control section 21b when receiving the positional information via the operation/control section 21b.

When the usage command information is received, the video game control server 10 refers to the battle command usage history table (Step S206), and executes a fusion attack determining process and attack power determining process for determining attack power (offensive power) in the case where it is determined to be a fusion attack (Step S207).

Here, the term "fusion attack" in the present embodiment means an integrated attack executed in accordance with a battle command specified by a player in the case where the battle command specified in a player terminal, in which the video game is played at a given place, by the player is the same as the battle command recently specified in another player terminal, in which the same video game is played within a predetermined area such as a neighboring place from the given place by another player. Namely, in the present embodiment, in the case where the battle command is specified multiple times within a predetermined area and in the near term, for example, a fusion attack having high attack power, in which attack power by the one or two or more same battle commands existing within a predetermined geographic and time range and the attack power of the battle command are integrated, is executed in accordance with how many times the specified battle command is used within the predetermined geographic and time range by other player(s).

In the fusion attack determining process at Step S207, the video game control server 10 determines whether more than a predetermined number (for example, 1 or 2) of battle commands having a command name the same as the command name corresponding to the battle command ID included in the received usage command information and satisfying a fusion determination condition (will be described later) are registered in the battle command usage history table or not. In the case where it is determined that more than the predetermined number of battle commands are registered in the battle command usage history table, the video game control server 10 determines that the battle command is to be a fusion attack (that is, an integrated battle command).

In the present embodiment, the "fusion determination condition" is a condition used within a predetermined range and within a predetermined period of time. The predetermined range and the predetermined period of time are set in a table for a fusion determination condition as shown in FIG. 6 in the present embodiment. The fusion determination condition table is created in advance and stored in the game information memory 13. The video game control server 10 specifies a fusion determination condition by referring to the fusion determination condition table, and then searches a battle command satisfying the fusion determination condition from the registration information of the battle command usage history table.

In this regard, the "fusion determination condition" is a condition used only within a predetermined range. Namely, used period of time is not included in the condition of the "fusion determination condition".

In the attack power determining process at Step S207, the video game control server 10 refers to a table for determination of offensive power (attack power) as shown in FIG. 7, for example, and determines a multiplication factor of the attack power (or offensive power) so as to be associated with the number of corresponding battle commands registered in the battle command usage history table. The offensive power determining table is created in advance and then stored in the game information memory 13. In the offensive power determining table, the number of corresponding battle command is associated with the multiplication factor of the offensive power for every kind of battle command. In this regard, a value directly indicating offensive power may be set in the offensive power determining table in place of the multiplication factor of the offensive power.

More specifically, in the case where the command name corresponding to the battle command ID included in the received usage command information is a "special technique A" at Step S207, the video game control server 10 refers to the fusion determination condition table (see FIG. 6), and confirms that the fusion determination condition of the "special technique A" is a condition that the "special technique A" is used within two hours (for example, if the current time is 18:30, 16:30 to 18:20) and within 500 m (that is, within 500 m from the current position of the player terminal 21). The video game control server 10 then refers to the offensive power determination table (see FIG. 7) to confirm that the required number for the "special technique A" is two, and refers to the battle command usage history table (see FIG. 3) to confirm that there are two battle command "special technique A" satisfying the fusion determination condition. The video game control server 10 refers to the offensive power determination table (see FIG. 7), and determines that the offensive power of the "special technique A" to be used becomes twice as a normal special technique A because the "special technique A" are used twice by other player(s). Namely, the video game control server 10 determines to instruct the player terminal to execute a fusion attack in which the offensive power by an attack from the player character in accordance with the "special technique A" is set to twice. The instruction to execute the "special technique A" is made by fusion determination result information (will be described later).

When the fusion attack determining process is executed and the offensive power determining process is also executed if necessary as described above, the video game control server 10 transmits fusion determination result information to the player terminal 21 via the base station 31 and the communication network 40 (Step S208). The fusion determination result information includes a fusion determination result indicating the determination result (information for specifying allowance or disallowance of the fusion attack, and information capable of specifying the offensive power in the case of allowance). The video game control server 10 then updates the battle command usage history table by adding each piece of the received usage command information that has been transmitted to the video game control server 10 from the player terminal 21 at Step S205 thereto as a usage history (Step S209).

At Step S209, the video game control server 10 creates usage history information including the battle command name of the battle command indicated by the battle command ID included in the usage command information received from the player terminal 21, the positional information (positional data) indicated by the positional information included in the received usage command information, the player ID included in the received usage command information and the time data indicating the time determined on the basis of reception of the usage command information, and updates the battle command usage history table by adding the created usage history information.

When the fusion determination result information is received, the operation/control section 21b of the player terminal 21 causes the player character to execute an attack action in accordance with the fusion determination result indicated by the received fusion determination result information (Step S210). More specifically, in the case where the fusion determination result indicates the "fusion attack allowance", the operation/control section 21b of the player terminal 21 causes the player character to execute the fusion attack action with the offensive power in which normal offensive power by the battle command received at Step S201 is increased to the offensive power indicated by the fusion determination result (in the present embodiment, increased with the multiplication factor indicated by the fusion determination result). On the other hand, in the case where the fusion determination result indicates "disallowance of a fusion attack", the operation/control section 21b of the player terminal 21 causes the player character to execute a normal attack action with normal offensive power by the battle command received at Step S201 (non-fusion attack action).

As explained above, in the embodiment described above, the video game control system 100 is constructed as follows. Namely, the video game control system 100 includes: the plurality of player terminals 21 to 2N respectively operated by a plurality of players in each of which a video game is played; and a video game control server 10 for controlling at least part of progress of the video game via the communication network 40. Namely, any of the player terminals 21 to 2N receives specification of an attack command (that is, battle command) for specifying an attack action that the player character is caused to execute by means of an attack specification operation by the player; measures a current position of the player terminal 21 or 2N when the specification of the attack command is received; transmits usage command information, including attack command information (battle command ID) indicating the received attack command, current position information indicating the measured current position of the player terminal and player identification information (player ID) for uniquely identifying the player, to the video game control server via the communication network 40; and causes the player character to execute the attack action specified on the basis of the received attack command. Further, the video game control server 10 includes the battle command usage history table for storing usage history information indicating a usage history of attack commands for each of the plurality of player terminals 21 to 2N; when usage command information, including the attack command information and the current position information, is received from the player terminal 21, determines whether or not an attack action by an attack command indicated by attack command information is to be a fusion attack action (an integrated attack action), in which the attack actions by the attack commands included in the usage history indicated by the usage history information are integrated, on the basis of a current position of the user terminal indicated by current position information; also determines attack power specification information (for example, information indicating a multiplication factor with respect to normal attack power) capable of specifying the attack power of the fusion attack action in the case where it is determined that the attack action is to be the fusion attack action; transmits attack instruction information (fusion determination result information) indicating the determination result to the player terminal 21; and updates the battle command usage history table by adding the received usage command information to the usage history of the attack commands. The player character is caused to execute the fusion attack action when the player terminal 21 receives from the video game control server 10 the attack instruction information including information that it is determined that the attack action is to be the fusion attack action, in which the attack power of the attack action indicated by the attack command received from the player is changed into the attack power specified by the received attack power specification information. Since the video game control server 10 has the configuration described above, it is possible to unpredictably change the contents of a video game using positional information indicating a position of a player. It is also possible to further diversify the game contents in a video game in which the positional information is used. This makes it possible to improve player's interest in play of the video game.

Namely, it is determined whether or not the attack action by the battle command specified by the player himself is to be the fusion attack action on the basis of not only the contents of the player's own specified battle command but also the battle commands that other player(s) used in a region neighboring the current position and the like. Thus, it is possible to unpredictably change the contents of a video game. Therefore, it is possible to add a new idea or plan to the video game, and it is possible to further diversify the game contents in the video game depending on the position of a player even though the game contents are the same.

Further, in the embodiment described above, the video game control server 10 determines that the attack action is to be the fusion attack action in the case where more than the predetermined number of attack commands, each of which is identical to the battle command notified from the player terminal 21, which have been used within a predetermined distance range from the current position of the player terminal 21 notified from the player terminal 21, are included in the usage history indicated by the usage history information; and determines the attack power so that the attack power of the fusion attack action gradually increases in accordance with the number of the included battle commands, which is more than the predetermined number. Thus, for example, it is possible to determine whether or not the attack action by the specified battle command is to be a fusion attack action on the basis of the battle commands that other player(s) playing the video game in the neighborhood have used, and this makes it possible to diversify the game contents in the video game.

Moreover, in the embodiment described above, in the embodiment described above, the video game control server 10 may determine that the attack action is to be the fusion attack action in the case where more than the predetermined number of attack commands, each of which is identical to the battle command notified from the player terminal 21, which have been used within a predetermined distance range from the current position of the player terminal 21 notified from the player terminal 21 and within a predetermine period of time, are included in the usage history indicated by the usage history information; and determine the attack power so that the attack power of the fusion attack action gradually increases in accordance with the number of the included battle commands, which is more than the predetermined number. Thus, for example, it is possible to determine whether or not the attack action by the specified battle command is to be a fusion attack action on the basis of the battle commands that other player(s) playing the video game in the neighborhood around the same time have used, and this makes it possible to diversify the game contents in the video game.

Furthermore, in the embodiment described above, the video game control server 10 determines the attack power specification information using the offensive power determination table (see FIG. 7) in which the number of the corresponding battle commands are associated with the attack power specification information (for example, a multiplication factor) for specifying the offensive power of the fusion attack action. Thus, it is possible to readily determine the offensive power in the case of the fusion attack. In addition, by changing the registration information of the offensive power determination information, it is possible to readily change the offensive power in the case of the fusion attack. In this case, the offensive power determination table may be one in which the number of the corresponding battle commands is registered so as to be associated with the attack power information (offensive power information) indicating the offensive power itself.

By providing the offensive power determination table as described above, it is possible to provide variation in magnitude of effects for every battle command when executing a fusion attack. For example, in the case of the example shown in FIG. 7, in comparison with a special technique C and magic B, the multiplication factors of the special technique C and the magic B are respectively 2.0 times and 1.8 times in the case where the number of the same command is one. Thus, the effect of the fusion attack for the special technique C is higher than that for the magic B. However, in the case where the number of the same command is two, the multiplication factors of the special technique C and the magic B are respectively 4.0 times and 5.0 times. In this case, it is possible to obtain a very high effect by the magic B. Since such an irregular multiplication factor setup can be made, the player takes into consideration the number of the same battle commands and may select, like a gambling, a battle command heightening a dramatic effect with respect to the number of the same battle commands (for example, the magic B in this case) while expecting that a fusion attack is activated. This makes it possible to add a new idea or plan to the video game.

Further, in the embodiment described above, although the battle command usage history table in which a usage history of the battle commands actually used by the respective player terminals 21 to 2N is registered is utilized, a virtual battle command usage history table in which a usage history of the battle commands virtually created by a system manager (or administrator) is registered may be utilized in place of or in addition to the battle command usage history table. In such a case, a method of selecting one of the battle command usage history table and the virtual battle command usage history table to be referred is not particularly limited. For example, the video game control server 10 may automatically select one in which a larger amount of information is registered to refer to it, or may always utilize the virtual battle command usage history table only for the player terminal positioned in a predetermined specific area. Since the video game control server 10 is constructed in this manner, it is possible to purposely adjust frequency of appearance of a fusion attack so that a fusion attack may appear even in a depopulated area in which players playing the video game are very few or the like. Further, when a player utilizes a specific battle command in a specific area, it is possible to purposely adjust frequency of appearance of a fusion attack so that a fusion attack appears with high probability.

Otherwise, for example, in the case where the number of the usage histories of the battle command around the current position of the player registered in the battle command usage history table is less than a predetermined number (for example, 100 times, 1,000 times or 10,000 times), the video game control server 10 may refer to the virtual battle command usage history table in addition to the battle command usage history table, or refer to the virtual battle command usage history table for shortfall against the predetermined number, or the fusion determination condition may be set so that by gradually relaxing a positional condition and/or a time condition that constitutes a reference range of the usage history until the predetermined number can be ensured, a fusion attack can be activated even in a place (such as a depopulated area) in which players playing the video game are very few. Since the video game control server 10 is constructed in this manner, the actual (or real) battle command usage history table can be preferentially referred to without using the virtual battle command usage history table as much as possible. This makes it possible to obtain an effect with reality.

In this regard, in the embodiment described above, the offensive power determination table is set, and attack power (offensive power) for each battle command when a fusion attack is activated is irregularly defined depending on how many same battle commands exist within a predetermined positional and time range. However, the attack power of a battle command when a fusion attack is activated may be set to the simple product of the number of battle commands existing within the positional and time range and the offensive power of the corresponding battle command when the battle command itself is separately activated. For example, in the case where the offensive power of "kesagiri" with single activation is set to "50" and five "kesagiri" commands exist within a predefined range, the attack power of the "kesagiri" command when a fusion attack is activated is set to "300" (the product of "50" and "6" times (because activation at this time is to be included)).

Moreover, a motion image of a command prepared for every battle command may be displayed so that an image for the command at single activation is differentiated from an image for the command at fusion activation. Namely, multiple patterns of motion images for every battle command are prepared in accordance with the magnitude of offensive power of a fusion attack, and the video game control server 10 instructs the corresponding player terminal to display the corresponding motion image in accordance with an activation state of the fusion attack. Since the video game control server 10 is constructed in this manner, it is possible to display a bright motion image along with the magnitude of an effect of a fusion attack (final offensive power) even for a battle command in which just a somber motion image is displayed when a battle command is separately activated. This makes the player to obtain a great deal of pleasure when a fusion attack is activated.

By constructing the video game control server 10 in this manner, in the case where a player character of a low level can use a battle command (or a technique) even though the battle command (or technique) is a battle command with weak offensive power when separately used, the probability of activation of a fusion attack may be increased. Thus, this makes it possible to apply a new idea or interest, in which the player may determine to specify a battle command with weak offensive power while expecting that a fusion attack with a larger effect is activated or to ensure reliable offensive power by specifying a battle command with great offensive power without expecting activation of a fusion attack, to the player.

Furthermore, in order to further increase the probability of activation of a fusion attack, it is thought that a plurality of players intentionally get together in the same place to play the same video game at the same time. Thus, since exchange between the players, which has merely been obtained in a virtual world in a conventional online video game, is likely obtained in the real world, the video game control server 10 of the present invention contributes development of the exchange between the players.

Further, in the embodiment described above, although the video game control system is constructed so that positional information of the player terminal 21 is to be registered to the video game control server 10 when the video game is started, the positional information may be transmitted to the video game control server 10 only when a battle command is used.

Moreover, in the embodiment described above, the video game control system is constructed so that in the case of activating a fusion attack action, the video game control server 10 determines the attack power specification information (for example, a multiplication factor with respect to a normal attack power) capable of specifying the offensive power of the fusion attack action and transmits the offensive power specification information to the corresponding player terminal 21. However, the video game control server 10 may determine the offensive power information (for example, a value directly indicating offensive power such as offensive power "100" or offensive power "150") indicating offensive power itself of the fusion attack action and transmit the offensive power information to the corresponding player terminal 21. By constructing the video game control server 10 in this manner, it is no need to execute a process to calculate the offensive power in the player terminal 21, and this makes it possible to reduce processing load of the player terminal 21.

In this regard, although one example of the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the present invention.

The present invention can be applied to a video game control system and the like that includes a plurality of player terminals respectively operated by a plurality of players and a video game control server that controls at least part of progress of a video game played in each of the plurality of player terminals in response to an operation by a player. Therefore, the present invention is useful.

What is claimed is:

1. A video game control system, comprising:
   a plurality of player terminals respectively operated by a plurality of players, a video game being played on each of the plurality of player terminals; and
   a video game control server that controls at least part of a progress of the video game via a communication network,
   wherein each of the plurality of player terminals comprises:
      an attack command receiver that receives a specification of an attack command that specifies an attack action that a player character is caused to execute against an enemy character by an attack specification operation by a specific player of the plurality of players;
      a position measurer that measures a current position of a specific player terminal of the specific player when the attack command receiver receives the specification of the attack command;
      a usage command information transmitter that transmits usage command information to the video game control server from the specific player terminal via the communication network, the usage command information including attack command information indicating an attack command received by the attack command receiver, current position information indicating a current position of the specific player terminal measured by the position measurer and player identification information for uniquely identifying the specific player; and
      an attack command executor that causes the player character to execute the attack action, specified on the basis of the attack command received by the attack command receiver, against the enemy character,
   wherein the video game control server comprises:
      a usage history information memory that stores the usage command information received from each of the plurality of player terminals and that stores a usage history of attack commands for each of the plurality of player terminals, the usage history of attack commands including attack commands executed by the plurality of player terminals;
      an integrated attack determiner that determines, when usage command information is received from the specific player terminal of the plurality of player terminals, whether the attack command included in the usage command information indicates an integrated attack action;
      the integrated attack determiner further determining, when it is determined that the attack command indicates the integrated attack action, at least one of attack power information indicating an attack power of the integrated attack action and attack power specification information that specifies the attack power;
      an attack instruction information transmitter that transmits attack instruction information indicating a determination result of the integrated attack determiner to the specific player terminal which has transmitted the usage command information; and
      a usage history information updater that updates the usage history information by adding the usage command information received from the specific player terminal to the usage history of the attack commands,
   wherein the integrated attack determiner determines whether the attack command that specifies the attack action to be executed against the enemy character indicates an integrated attack action by comparing the attack command information and the current position information included in the usage command information transmitted from the specific player terminal to the video game control server with the usage history of attack commands of the plurality of player terminals that are stored in the usage history information memory and that were executed by the plurality of player terminals at a position located within a predetermined distance of the current position of the specific player terminal, and
   wherein the attack command executor causes the player character controlled by the specific player terminal to execute the integrated attack action against the enemy character when the specific player terminal receives, from the video game control server, the attack instruction information including information that it is determined that the attack action is to be the integrated attack action, the attack power of the integrated attack action being at least one of indicated by the attack power information and specified by the attack power specification information.

2. The video game control system according to claim 1, wherein the integrated attack determiner determines that the attack action is to be the integrated attack action when more than a predetermined number of attack commands, each of which is identical to the attack command indicated by the attack command information included in the usage command information received from the specific player terminal and that have been used within a predetermined distance range from the current position of the specific player terminal indicated by the current position information included in the received usage command information, are included in the usage history indicated by the usage history information, and
wherein the integrated attack determiner determines the at least one of the attack power information and the attack power specification information so that the attack power of the integrated attack action gradually increases in accordance with the number of the included attack commands that exceed the predetermined number.

3. The video game control system according to claim 2, wherein the integrated action determiner refers to the usage histories registered in the usage history information other than the usage history of the attack command for the specific player terminal that has transferred the usage command information to the video game control server.

4. The video game control system according to claim 2, wherein the video game control server further comprises a virtual usage history information memory for storing virtual usage history information indicating a usage history of an attack command virtually created, and
wherein the integrated attack determiner determines whether the attack action is to be the integrated attack action using the virtual usage history information in place of the usage history information in the case where the current position of the player terminal indicated by the current position information included in the received usage command information is positioned within a specific area.

5. The video game control system according to claim 4, wherein the integrated attack determiner determines whether the attack action is to be the integrated attack action using the usage history in the virtual usage history information in the case where the number of the usage histories of the attack command in the usage history information is less than a predetermined number.

6. The video game control system according to claim 2, wherein the integrated attack determiner determines the at least one of the attack power information and the attack power specification information using a table for determination of attack power specification information in which the number of the corresponding attack commands is associated with the at least one of the attack power information and the attack power specification information.

7. The video game control system according to claim 1, wherein the integrated attack determiner determines that the attack action is to be the integrated attack action when more than a predetermined number of attack commands, each of which is identical to the attack command indicated by the attack command information included in the usage command information received from the specific player terminal and that have been used within a predetermined distance range from the current position of the specific player terminal indicated by the current position information included in the received usage command information and within a predetermined period of time, are included in the usage history indicated by the usage history information, and
wherein the integrated attack determiner determines the attack power specification information so that the attack power of the integrated attack action gradually increases in accordance with the number of the included attack commands that exceed the predetermined number.

8. The video game control system according to claim 1, wherein the position measurer measures the current position of the player terminal on the basis of positioning signals from a plurality of positioning satellites.

9. The video game control system according to claim 1, wherein the usage history information includes used attack command information indicating an attack command that has been used, usage position information indicating the position of the player terminal when the attack command is used, usage time information indicating time when the attack command is used, and the player identification information, and
wherein the usage history information updater creates additional information to the usage history information by specifying the attack command indicated by the attack command information included in the received usage command information as the used attack command information, specifying the position information indicated by the current position information included in the received usage command information as the usage position information, adding the player identification information included in the received usage command information and determining the usage time information on the basis of reception of the usage command information, and updates the usage history information.

10. A video game control server for controlling at least part of a progress of a video game via a communication network, the video game being played on each of a plurality of player terminals, the plurality of player terminals being respectively operated by a plurality of players, the video game control server comprising:
a usage history information memory that stores usage history information received from each of the plurality of player terminals and that stores a usage history of attack commands for each of the plurality of player terminals, the usage history of attack commands including attack commands executed by the plurality of player terminals, the attack commands indicating attack actions that player characters executed against enemy characters;
an integrated attack determiner that determines, when usage command information is received from a specific player terminal of the plurality of player terminals, whether an attack command that indicates an attack action that a player character is to execute against an enemy character and that is included in the usage command information indicates an integrated attack action, the integrated attack determiner further determining, when it is determined that the attack command indicates the integrated attack action, at least one of attack power information indicating an attack power of the integrated attack action and attack power specification information that specifies the attack power;
an attack instruction information transmitter that transmits attack instruction information indicating a determination result of the integrated attack determiner to the specific player terminal which has transmitted the usage command information, so that the player character controlled by the specific player terminal is caused to execute the integrated attack action, in which the attack power of the integrated attack action is at least one of indicated by the attack power information and specified by the attack power specification information, against the enemy character; and a usage history information updater that updates the usage history information by adding the received usage command information to the usage history of the attack commands, wherein the integrated attack determiner determines whether the attack command that specifies the attack action to be executed against the enemy character indicates an integrated attack action by comparing the attack command information and the current position information included in the usage command information transmitted from the specific player terminal to the video game control server with the usage history of attack commands of the plurality of player terminals that are stored in the usage history information memory and that were executed by the plurality of player terminals at a position located within a predetermined distance of the current position of the specific player terminal.

11. The video game control server according to claim 10, wherein the integrated attack determiner determines that the attack action is to be the integrated attack action when more than a predetermined number of attack commands, each of which is identical to the attack command indicated by the attack command information included in the usage command information received from the specific player terminal and that have been used within a predetermined distance range from the current position of the specific player terminal indicated by the current position information included in the received usage command information, are included in the usage history indicated by the usage history information, and wherein the integrated attack determiner determines the at least one of the attack power information and the attack power specification information so that the attack power of the integrated attack action gradually increases in accordance with the number of the included attack commands that exceed the predetermined number.

12. The video game control server according to claim 11, wherein the integrated action determiner refers to the usage histories registered in the usage history information other than the usage history of the attack command for the specific player terminal that has transferred the usage command information to the video game control server.

13. The video game control server according to claim 11, further comprising a virtual usage history information memory that stores virtual usage history information indicating a usage history of an attack command virtually created, wherein the integrated attack determiner determines whether the attack action is to be the integrated attack action using the virtual usage history information in place of the usage history information in the case where the current position of the player terminal indicated by the current position information included in the received usage command information is positioned within a specific area.

14. The video game control server according to claim 13, wherein the integrated attack determiner determines whether the attack action is to be the integrated attack action using the usage history in the virtual usage history information in the case where the number of the usage histories of the attack command in the usage history information is less than a predetermined number.

15. The video game control server according to claim 11, wherein the integrated attack determiner determines the at least one of the attack power information and the attack power specification information using a table for determination of attack power specification information in which the number of the corresponding attack commands is associated with the at least one of the attack power information and the attack power specification information.

16. The video game control server according to claim 10, wherein the integrated attack determiner determines that the attack action is to be the integrated attack action when more than a predetermined number of attack commands, each of which is identical to the attack command indicated by the attack command information included in the usage command information received from the specific player terminal and that have been used within a predetermined distance range from the current position of the specific player terminal indicated by the current position information included in the received usage command information and within a predetermined period of time, are included in the usage history indicated by the usage history information, and wherein the integrated attack determiner determines the attack power specification information so that the attack power of the integrated attack action gradually increases in accordance with the number of the included attack commands that exceed the predetermined number.

17. The video game control server according to claim 10, wherein the position measurer measures the current position of the player terminal on the basis of positioning signals from a plurality of positioning satellites.

18. The video game control server according to claim 10, wherein the usage history information includes used attack command information indicating an attack command that has been used, usage position information indicating the position of the player terminal when the attack command is used, usage time information indicating time when the attack command is used, and the player identification information, and wherein the usage history information updater creates additional information to the usage history information by specifying the attack command indicated by the attack command information included in the received usage command information as the used attack command information, specifying the position information indicated by the current position information included in the received usage command information as the usage position information, adding the player identification information included in the received usage command information and determining the usage time information on the basis of reception of the usage command information, and updates the usage history information.

* * * * *